United States Patent
Baccanini et al.

(10) Patent No.: US 6,478,131 B2
(45) Date of Patent: Nov. 12, 2002

(54) ELECTROMECHANICAL ACTUATOR

(75) Inventors: Mario Baccanini, Santantonino Saluggia (IT); Paolo Da Pont, Turin (IT)

(73) Assignee: Elbi International S.p.A., Turin (IT)

( * ) Notice: Subject to any disclaimer, the term of this patent is extended or adjusted under 35 U.S.C. 154(b) by 0 days.

(21) Appl. No.: 09/886,124

(22) Filed: Jun. 22, 2001

(65) Prior Publication Data
US 2002/0027057 A1 Mar. 7, 2002

(30) Foreign Application Priority Data
Jun. 23, 2000 (IT) ........................................ TO00A0617

(51) Int. Cl.⁷ ................................................ D06F 37/30
(52) U.S. Cl. ...................... 192/143; 192/69.8; 68/12.24
(58) Field of Search .............................. 192/138, 142 R, 192/143, 69.8, 93 R; 68/12.24, 23.7

(56) References Cited

U.S. PATENT DOCUMENTS

| | | | | |
|---|---|---|---|---|
| 2,625,248 A | * | 1/1953 | Geldhof et al. | 192/116.5 |
| 2,942,446 A | * | 6/1960 | Platt et al. | 68/23.7 X |
| 2,963,159 A | * | 12/1960 | Stone | 68/12.24 X |
| 3,576,117 A | * | 4/1971 | Cowan et al. | 192/93 R |
| 4,430,871 A | * | 2/1984 | Brenner et al. | 68/12.25 |
| 6,213,274 B1 | | 4/2001 | Micai | |

* cited by examiner

*Primary Examiner*—Richard M. Lorence
(74) *Attorney, Agent, or Firm*—Sughrue Mion, PLLC.

(57) ABSTRACT

The actuator comprises: an actuator member which is moveable relative to the structure and can perform an actuation movement in one direction and a return movement in the opposite direction, an electric motor including a rotor portion which can translate from a first, rest axial position to a second, working axial position as a result of an energization of the stator and against the action of a spring, a gear transmission which is coupled to the actuator member and can be coupled for rotation with the rotor portion when the latter is in the working axial position in order to bring about an actuator movement of the actuator member, and a stop device with a retaining member which can adopt an inactive condition and an active condition and an active condition in which it permits and prevent a return movement of the actuator member, respectively. The retaining member is operatively coupled to the rotor portion of the motor in a manner such that it can adopt the inactive condition and the active condition when the rotor portion adopts the rest position and when it adopts the working position, respectively.

10 Claims, 5 Drawing Sheets

ELECTROMECHANICAL ACTUATOR

BACKGROUND OF THE INVENTION

The present invention relates to an electromechanical actuator usable, in particular but not exclusively, for operating a coupling and transmission device for the laundry drum of a washing and/or drying machine.

SUMMARY OF THE INVENTION

The aim of the present invention is to provide an improved electromechanical actuator which can be produced easily and economically and, in particular, with the use of a single electrically-operated device.

This and other aims are achieved, according to the invention, by an electromechanical actuator comprising:

a stationary support structure, an actuator member which is movable relative to the structure and can perform an actuation movement in one direction and a return or release movement in the opposite direction, an electric motor connected to the structure and including a rotor portion which can translate from a first, rest axial position to a second, working axial position as a result of an energization of the stator and against the action of resilient means, a gear transmission which is coupled to the actuator member and can be coupled for rotation with the rotor portion of the motor when the rotor portion is in the working axial position, in order to bring about an actuation movement of the actuator member, and a stop device comprising a movable retaining member which can adopt an inactive condition and an active condition in which it permits and prevents a return movement of the actuator member, respectively, the retaining member being operatively coupled to the rotor portion of the motor in a manner such that it can adopt the inactive condition and the active condition when the rotor portion adopts the rest position and when the rotor portion adopts the working position, respectively.

In the electromechanical actuator according to the invention, the rotor portion of the electric motor, which is so advantageously a synchronous electric motor, also acts as a linear actuator for controlling the stop device without requiring a special electrically-operated actuator, for example, such as a solenoid, for this purpose.

BRIEF DESCRIPTION OF THE PREFERRED

Figure 1:
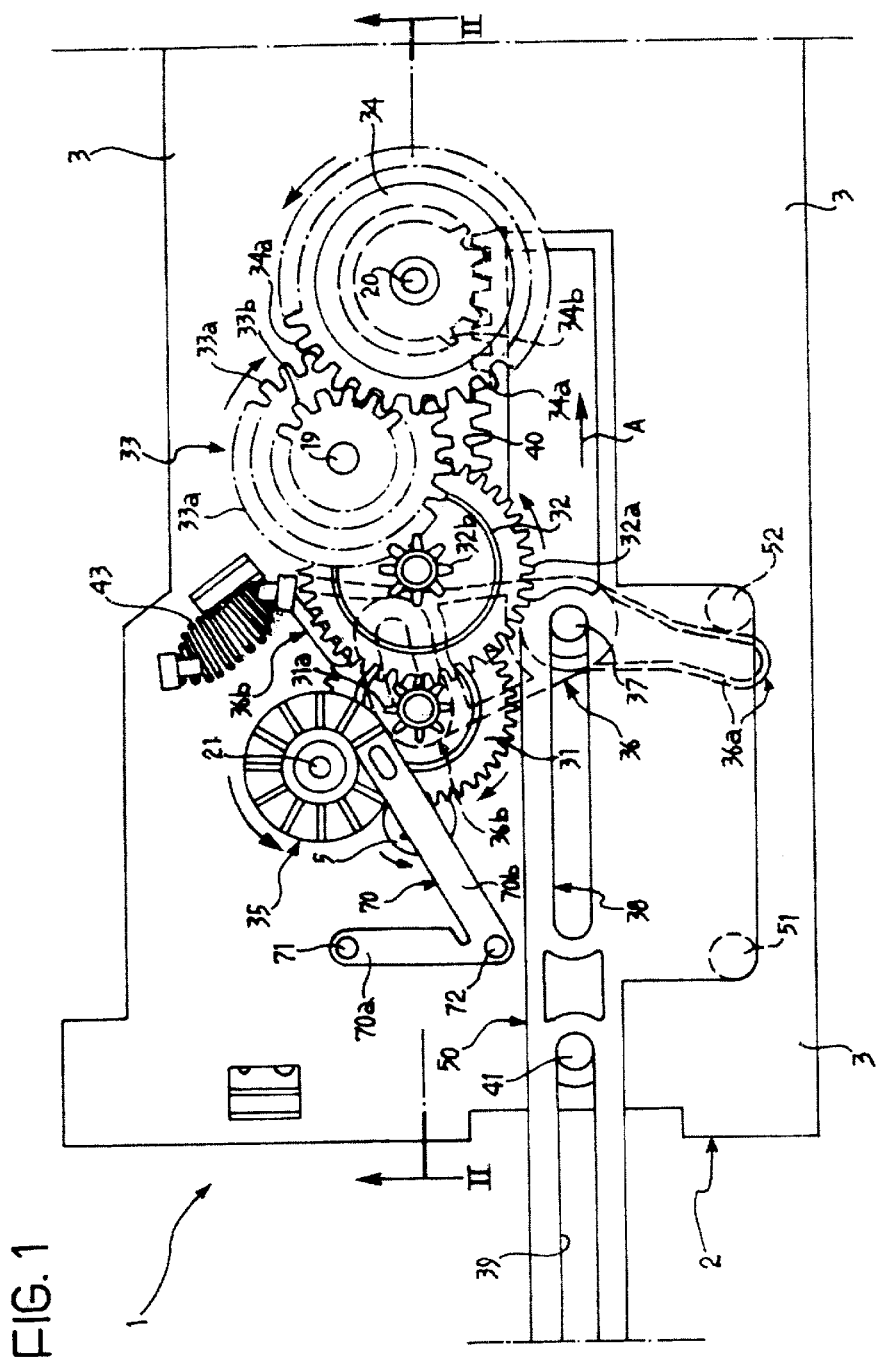
Figure 2:
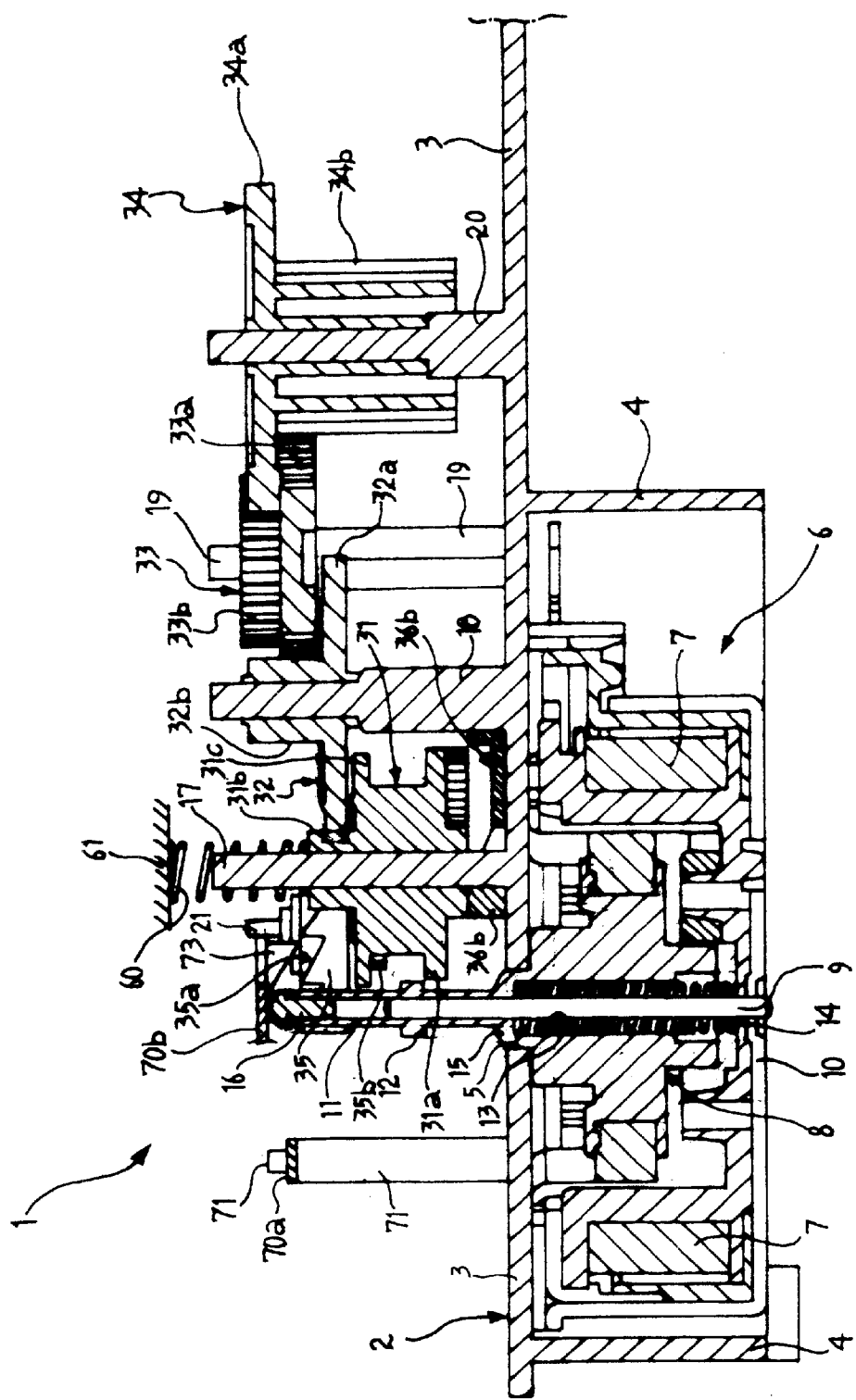
Figure 3:
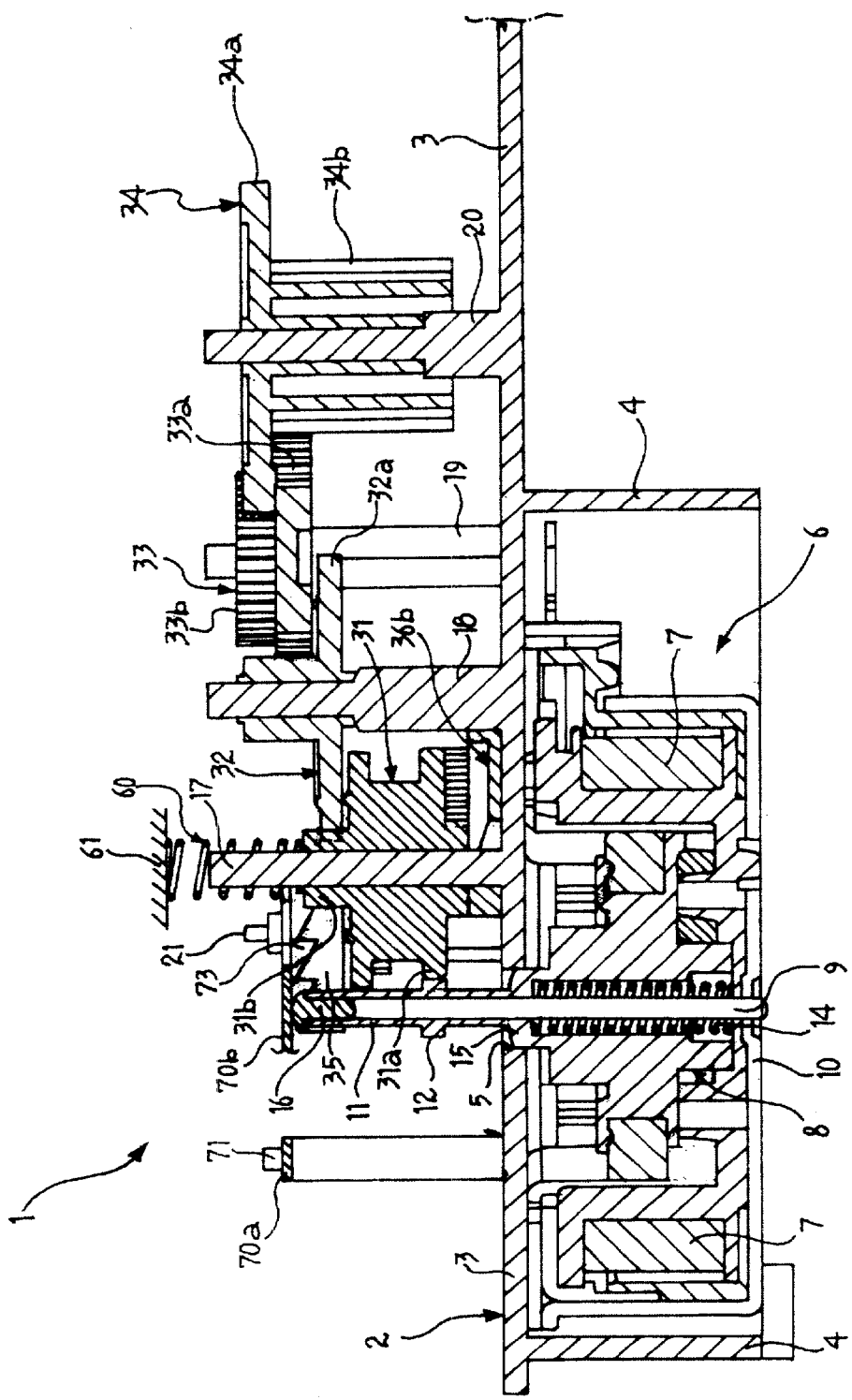
Figure 4:
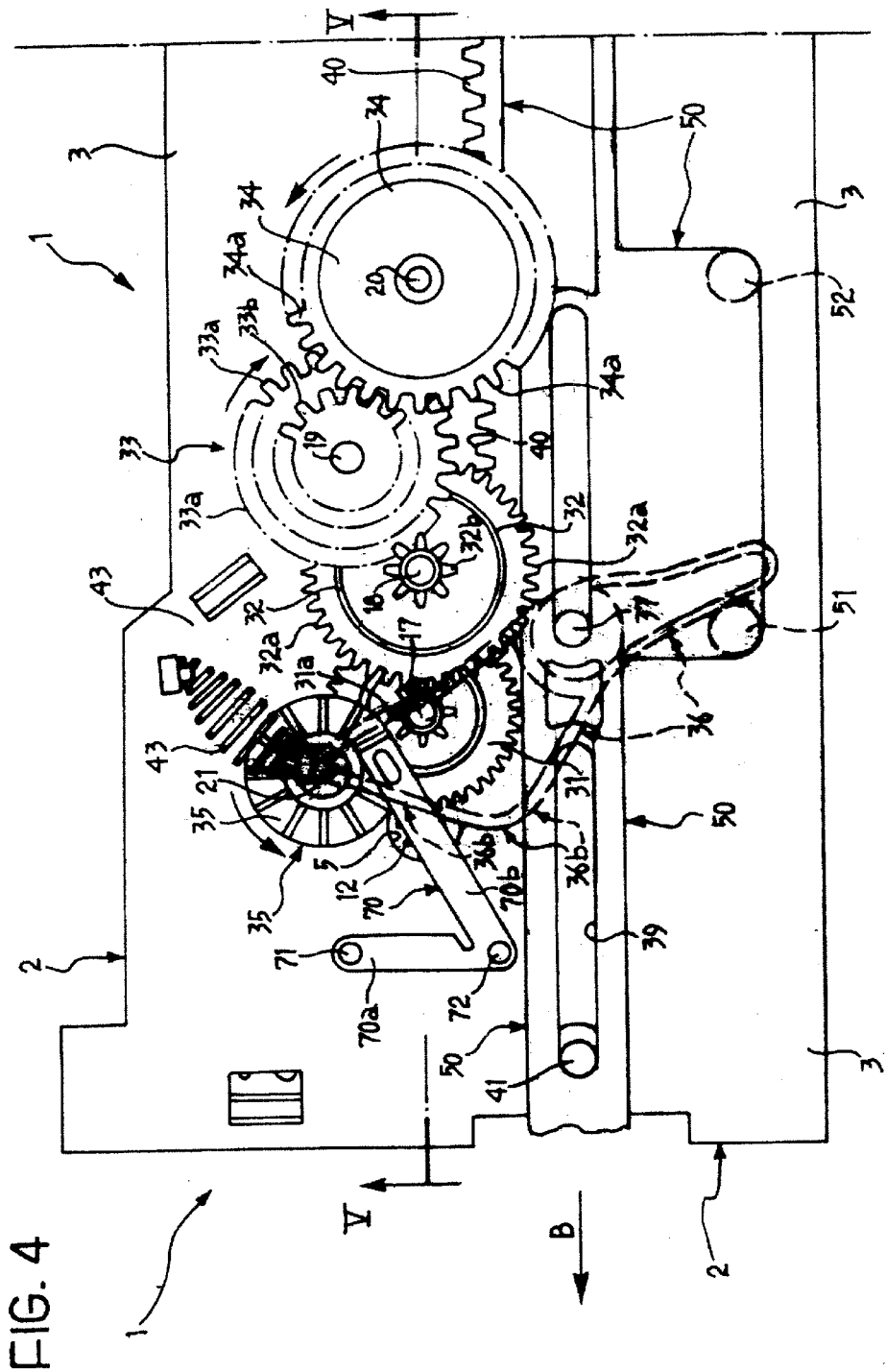
Figure 5:
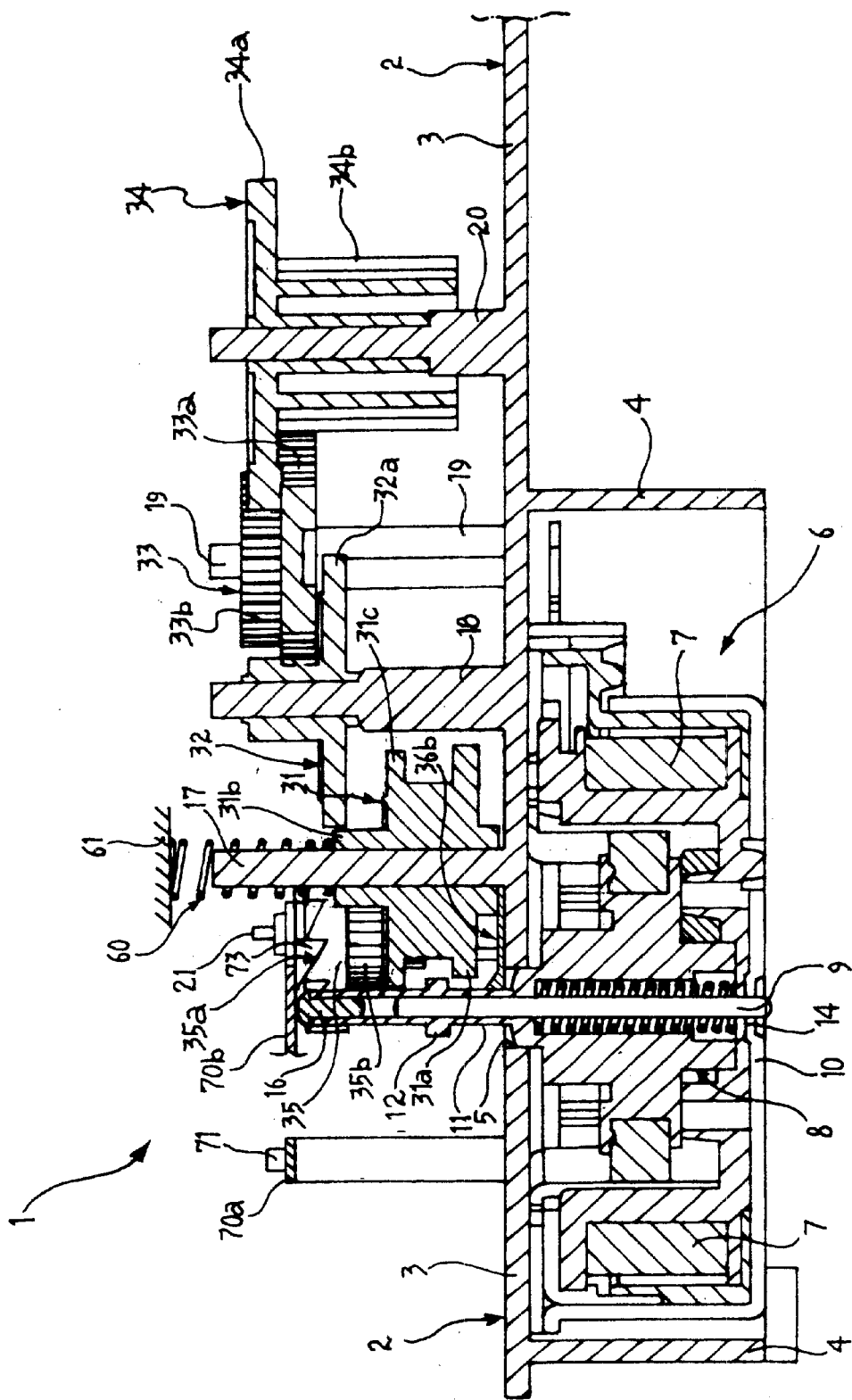

Further characteristics and advantages of the invention will become clear from the following detailed description, given purely by way of non-limiting example, with reference to the appended drawings, in which:

FIG. 1 is a partial plan view of an electromechanical actuator according to the invention, FIG. 2 is a partial section taken on the line II—II of FIG. 1, FIG. 3 is a view similar to that of FIG. 2 and shows the actuator in a different operative condition, FIG. 4 is a view similar to that of FIG. 1 and shows the actuator in another operative condition, and FIG. 5 is a partial section taken on the line V—V of FIG. 4.

DETAILED DESCRIPTION OF THE INVENTION

In FIG. 1, an electromechanical actuator according to the invention is generally indicated 1.

The actuator comprises a support structure 2 which, in the embodiment shown by way of example, comprises a plate 3 from which a substantially annular lower skirt 4 extends (FIGS. 2 and 3).

The portion of the plate 3 around which the skirt 4 extends has an opening, indicated 5.

An electric motor, generally indicated 6, is fixed to the plate 3, inside the skirt 4. The motor is, for example, a synchronous, alternating-current motor and comprises a stator 7 which surrounds a rotor having permanent magnets and generally indicated 8. In the specific embodiment illustrated, the rotor 8 is hollow axially and is mounted so as to be rotatable and axially slidable relative to a fixed shaft 9 secured to a casing 10 of the motor. The rotor 8 comprises, in particular, a tubular end appendage 11 provided externally with a pinion 12 in its intermediate region.

At its end remote from the tubular appendage 11, the rotor 8 has an axial cavity 13 in which a helical spring 14 is arranged around the fixed shaft 9 and tends to urge the entire rotor 8 axially towards the plate 3, that is, upwards as seen in FIGS. 2 and 3.

At the base of the tubular end portion 11, the rotor 8 has a portion 15 which extends partially in the opening 5 of the plate 3.

The free end of the tubular portion 11 of the rotor 8 carries a push rod 16 the functions of which will be described below.

In known manner, the electric motor 6 is formed in a manner such that its rotor portion 8 can translate axially from a first, rest position shown in FIG. 2 to a second, working axial position, shown, for example, in FIGS. 3 and 5, as a result of the energization of the stator 7 and against the action of the spring 14. When the stator 7 is de-energized, the spring 14 arranges the rotor 8 in the rest position and then keeps it there (FIG. 2).

A plurality of substantially parallel support elements, indicated 17 to 21 in FIGS. 2, 3 and 5, extend from the opposite face of the support plate 3 to the skirt 4.

The support element 17 is substantially a pin around which a gear 31 is mounted so as to be rotatable and axially translatable.

The support elements 18, 19, 20 and 21 have respective prismatic base portions and respective cylindrical end portions acting as pins for respective gears 32, 33, 34 and 35.

The gear 31 has a lower ring of teeth 31a which can mesh with the pinion 12 of the rotor of the electric motor 6 in operation, as will be described further below. The gear 31 also has a second ring of teeth 31b of smaller diameter, which can mesh with a lower ring of teeth 32a of the gear 32, as will be described further below. The latter also has a second ring of teeth 32b of smaller diameter which meshes permanently with a lower ring of teeth 33a of the gear 33.

The gear 33 in turn has an upper ring of teeth 33b of smaller diameter which meshes permanently with the upper ring of teeth 34a of the gear 34. The latter also has a lower ring of teeth 34b of smaller diameter which meshes with the rack 40 (FIGS. 1 and 4) of an actuator member, generally indicated 50.

The actuator member 50 is mounted so as to be translatable relative to the support structure 2 and, in particular, can perform an actuation movement in the direction of the arrow A of FIG. 1 and a return or release movement in the opposite direction, that is, in the direction of the arrow B of FIG. 4.

In particular, the actuator member 50 may be connected by means of a transmission element such as, for example, a metal cable, to a coupling and transmission device associated with the laundry drum of a washing machine.

The gear 31 bears on a portion or arm of a lever 36 mounted for rotating in a plane parallel to the plate 3 about a pin 37 fixed to the plate (FIG. 1).

In the embodiment shown, the pin 37 extends through a slot 38 formed in an intermediate portion of the actuator member 50. The actuator member has a further slot 39 through which a further pin 41 extends, the pin 41 being in alignment with the pin 37 along the axis of translation of the actuator member 50.

With further reference to the lever 36, this lever has a portion or arm 36a which extends between two pins 51 and 52 that extend from the lower side of an intermediate portion of the actuator member 50. The lever 36 has a further arm 36b which is remote from the arm 36a and extends partially beneath the gear 31. The portion of the arm 36b of the lever 36 which extends beneath the gear 31 has a thickness which is differentiated peripherally in the manner of a cam profile.

In FIG. 1, the actuation member 50 is shown in the travel-limit position which is reached upon completion of a return or release movement. Starting from this position, the actuator member 50 can be moved (as will be described below) in the direction of the arrow A to reach the travel-limit position shown in FIG. 4, which corresponds to the final position of an actuation movement or the starting position for a subsequent return or release movement.

When the actuator member 50 approaches the position shown in FIG. 4, its pin 51 encounters and then acts on the portion or arm 36a of the lever 36, causing the lever to pivot and arranging it in the position shown in FIG. 4. Similarly, during the movement from the position shown in FIG. 4 to that shown in FIG. 1, as the actuator member 50 approaches the return travel limit, its pin 52 encounters the portion or arm 36a of the lever 36 and then urges it to the operative position shown in FIG. 1.

One end of a spring 43 is connected to the end of the arm 36b of the lever 36 and the other end of the spring is restrained on the support structure 2. The spring enables the lever 36 to be stabilized in either of the operative positions shown in FIGS. 1 and 4.

As pointed out above, the arm 36b of the lever 36 has a profile of variable thickness on which the gear 31 bears. This profile is formed in a manner such that, when the lever 36 is in the position shown in FIG. 1, the gear 31 is kept axially raised, in a position in which its ring of teeth 31b is coupled or meshes with the ring of teeth 32a of the adjacent gear 32, as shown in FIGS. 2 and 3.

When the lever 36 is in the operative position of FIG. 4, however, the cam profile of its arm 36b allows the gear 31 to move downwards towards an axially lowered position in which its ring of teeth 31a is disengaged from the pinion 12 of the rotor of the electric motor 6 (FIG. 5).

Advantageously, but not necessarily, a spring 60 is arranged around the pin 17, between the gear 31 and a cover 61 (shown partially in FIGS. 2, 3 and 5 and fixed to the support structure 2 in known manner), the spring 60 tending to urge the gear 31 towards the plate 3 and to stabilize its position in the uncoupling condition shown in FIG. 5.

The gear 35 is a gear which has an upper ring of saw-tooth-shaped triangular teeth 35a, and a lower ring of radial teeth 35b which meshes with an intermediate ring of teeth 31c of the gear 31.

A resiliently flexible plate is indicated 70 in the drawings. In the embodiment shown by way of example, the plate 70 is generally substantially V-shaped (FIGS. 1 and 4). The plate 70 has a portion 70a the two ends of which are fixed to two supports 71 and 72 which extend from the plate 3 of the support structure 2. The plate 70 has a second portion 70b which projects from the support 72 in the manner of a cantilever, over the gear 35. The free end of the portion 70b of the plate 70 carries beneath it a triangular tooth 73 which can be wedged in the space defined between two adjacent teeth of the ring of face teeth of the gear 35.

As can best be seen in FIGS. 2 and 3, when the motor is in the deactivated condition and the rotor 8 is thus in the raised position, the end push rod 16 associated with the rotor 8 of the electric motor 6 can keep the portion 70b of the plate 70 in a raised position in which the tooth or pawl 73 is disengaged from the ring of face teeth of the gear 35. When, as a result of the energization of the motor 6, the rotor 8 is attracted magnetically downwards against the action of the spring 14, the portion 70b of the plate 70 is lowered, owing to its own resilience, and the tooth or pawl 73 is engaged between two adjacent teeth of the gear 35, as shown in FIGS. 3 and 5. In this condition, the pawl 73 allows the gear 75 to rotate in one direction (anticlockwise as seen in FIGS. 1 and 4), but prevents that gear from rotating in the opposite direction.

The device described above operates in the following manner.

At rest, that is, in the deactivated condition, the actuator 1 adopts the configuration shown in FIGS. 1 and 2. In this condition, the electric motor 6 is not energized and its rotor 8 is in the raised, rest axial position in which its pinion 12 is disengaged from the teeth 31a of the gear 31 and its end push rod 16 keeps the pawl 73 carried by the plate 70 in the raised position and disengaged from the face teeth of the gear 35. Moreover, in this condition, the arm or portion 36b of the lever 36 keeps the gear 31 in the raised, coupling position.

When the electric motor 6 is energized, its rotor 8 is attracted axially towards the base of the casing 10 against the action of the spring 14. The rotor is thus brought to the position shown in FIG. 3, in which its pinion 12 meshes with the ring of teeth 31a of the gear 31 and its end push rod 16 allows the pawl 73 to engage between two adjacent face teeth of the gear 35. The rotation of the rotor 8 thus brings about rotation of the gear 31 which represents the input gear of the transmission (comprising the gears 32, 33 and 34) which, when coupled with the rack 40, enables the actuator member 50 to be translated in the direction indicated by the arrow A in FIG. 1. The rotation of the gear 31 also brings about rotation of the gear 35 with face teeth, in the direction permitted by the pawl 73.

The actuation movement of the member 50 continues until the travel-limit shown in FIG. 4 is reached. As already described above, shortly before the travel-limit position is reached, the pin 51 of the actuator member 50 engages and pivots the lever 36 which is thus arranged in the position shown in FIGS. 4 and 5. The gear 31 is consequently lowered along the pin 17 under the effects of its own weight and of the spring 60 and adopts the position shown in FIG. 5. In this condition, the gear 31 is disengaged from the pinion 12 of the rotor of the electric motor 6.

In the condition shown in FIG. 5, however, the gear 31 is still in engagement with the lower radial teeth of the gear 35.

The electric motor 6 thus continues to rotate, but freely, that is, it is released from the gear transmission. The actuator 50 is kept in the position shown in FIG. 4 and is thus prevented from returning as a result of the locking performed by the pawl 73 on the gear 35 which prevents reverse rotation of the entire transmission.

The actuator is deactivated at the moment at which the electric motor 6 is de-energized; the rotor 8 of the motor is then returned to the raised, rest position shown in FIG. 2, by the action of the spring 14, releasing the pawl 73 from the gear 35. The actuator member 50, which is subjected to tensile stress in the direction of the arrow B of FIG. 4 by the device with which it is associated, for example, a coupling and transmission device, thus brings about reverse rotation of the entire gear transmission and is returned to the travel-limit position shown in FIG. 1. As it approaches this travel-limit position, the pin 52 of the actuator member 50 engages the lever 36 and causes its position to change to the position of FIG. 1 so that the gear 31 is returned to the raised starting position shown in FIG. 2.

The actuator described above enables all of the functions (the actuation movement of the member 50, stopping of the is return movement of the transmission 31–34, release of the transmission 31–34 to return to the starting conditions) to be performed with the use of a single electrically-operated device constituted by the electric motor 6. In particular, the control of the ratchet stopping mechanism comprising the gear 35 and the plate 70 with the associated pawl 73 does not require the use of a further electrically-operated device such as a solenoid actuator or the like.

The actuator according to the invention may also be used, for example, for controlling a gate valve.

Moreover, the electric motor included therein may be of the type in which at least a portion of the rotor can adopt two different axial positions according to whether a voltage having a first value or a second value is applied to the stator.

What is claimed is:

1. An electromechanical actuator, in particular for controlling a brake associated with the laundry drum of a washing machine, comprising:
    a stationary support structure,
    an actuator member which is movable relative to the structure and can perform an actuation movement in one direction and a return or release movement in the opposite direction,
    an electric motor connected to the structure and including a rotor portion which can translate from a first, rest axial position to a second, working axial position as a result of an energization of a stator and against the action of resilient means,
    a gear transmission which is coupled to the actuator member and can be coupled for rotation with the rotor portion of the motor when the rotor portion is in the working axial position, in order to bring about an actuation movement of the actuator member, and
    a stop device comprising a movable retaining member which can adopt an inactive condition and an active condition in which it permits and prevents a return of movement of the actuator member, respectively,
    the retaining member being operatively coupled to the rotor portion of the motor in a manner such that it can adopt the inactive condition and the active condition when the rotor portion adopts the rest position and when the rotor portion adopts the working position, respectively.

2. An actuator according to claim 1 in which the transmission comprises a gear mounted so as to be axially translatable between a coupling position and an uncoupling position in which it can permit and interrupt the transmission of the drive, respectively, the gear being operatively controlled in a manner such that it can adopt the uncoupling position and the coupling position, when the actuator member has substantially completed the actuation movement and the return movement, respectively.

3. An actuator according to claim 1 in which the actuator member is mounted so as to be translatable relative to the support structure and is coupled to the transmission by means of a rack.

4. An actuator according to claim 1, in which the stop device comprises a gear with triangular teeth operatively coupled to the transmission, and in which the retaining member is a pawl connected to a plate moveable as a result of the translation of the rotor portion of the electric motor.

5. An actuator according to claim 2, in which the gear is the input gear of the transmission.

6. An actuator according to claim 2 in which an operating mechanism is associated with the gear and can be actuated by the actuator member.

7. An actuator according to claim 6 in which the operating mechanism comprises a lever which is pivotable in a plane substantially perpendicular to the axis of rotation of the gear and which has a cam profile on which the gear bears, the lever being pivotable between a first position and a second position in which, by means of the cam profile, it keeps the gear in the uncoupling position and in the coupling position, respectively.

8. An actuator according to claim 7 in which resilient stabilizing means are associated with the lever and tend to keep it in the first position or in the second position.

9. An actuator according to claim 7 in which resilient means are associated with the gear and tend to urge it to the uncoupling position.

10. An actuator according to claim 1 in which the electric motor is a synchronous, alternating-current motor.

* * * * *